United States Patent
Lee et al.

(10) Patent No.: US 6,691,426 B1
(45) Date of Patent: Feb. 17, 2004

(54) TAPE MEASURE DEVICE

(76) Inventors: Choon Nam Lee, 4114 Roussean La., Palos Verdes Penninsula, CA (US) 90274; Kyoung Soo Choi, 625 Hickey Blvd., #A, Pacifica, CA (US) 94044

( * ) Notice: Subject to any disclaimer, the term of this patent is extended or adjusted under 35 U.S.C. 154(b) by 0 days.

(21) Appl. No.: 10/293,566

(22) Filed: Nov. 13, 2002

(51) Int. Cl.[7] .................................................. G01B 3/10
(52) U.S. Cl. ............................. 33/759; 33/761; 33/765; 33/769
(58) Field of Search ........................ 33/759, 755, 761, 33/765, 766, 769, 494, 679.1

(56) References Cited

U.S. PATENT DOCUMENTS

| | | | | |
|---|---|---|---|---|
| 4,760,648 A | * | 8/1988 | Doak et al. ................. | 33/668 |
| 5,894,677 A | * | 4/1999 | Hoffman ..................... | 33/758 |
| 6,530,159 B2 | * | 3/2003 | Tarver, III .................. | 33/759 |

* cited by examiner

*Primary Examiner*—Christopher W. Fulton
(74) *Attorney, Agent, or Firm*—Park & Sutton LLP; John K. Park

(57) ABSTRACT

A tape measure comprises a housing having a bottom surface and a front surface substantially perpendicular to the bottom surface, a tape strip elastically wound within the housing to become released from the housing when required, and a tubular protrusion extending from between the bottom surface and the front surface to incorporate a tunnel therethrough. The tunnel is open into the housing and an upper covering of the tubular protrusion has an opening so that indicia of the tape strip are read from atop through the opening.

14 Claims, 2 Drawing Sheets

TAPE MEASURE DEVICE

BACKGROUND OF THE INVENTION

The invention relates to a tape measure. More particularly, the present invention relates to a tape measure device having a tubular protrusion whose upper opening enables a user to reliably read indicia on a tape strip in further accuracy.

A tape measure is well known as a measurement tool widely used by non-carpenter individuals as well as carpenters. Such a conventional tape measure has long been regarded as a necessity to both novices and professionals in wood board work and other construction works. Although the conventional tape measure has been serving as a convenient measurement tool, its functional usability has been disregarded that would be significantly increased by adding novel concepts to the measurement focused tool.

A disadvantage of the conventional tape measure is confusion and inaccuracy in indicia reading while measuring a target object, because indicia is usually read from a corner of the tape measure through which the tape strip travels in and out. So a demand on the market is a tape measure that secures a reliable indicia reading with increased accuracy.

SUMMARY OF THE INVENTION

The present invention is contrived to overcome the conventional disadvantages. Accordingly, it is an object of the present invention to provide a tape measure that improves accuracy in reading indicia of a tape strip thereof.

It is another object of the present invention to provide a tape measure that secures a widened range of viewable indicia, thereby satisfying delicate demands from those using the same in a high frequency.

A further object is to provide a tape measure that cooperatively receives thereinto an extended hook on a tape strip tip thereof, thereby enhancing usability.

To achieve the above-mentioned objects, the tape measure according to the present invention comprises a housing having a bottom surface and a front surface substantially perpendicular to the bottom surface. A measuring tape strip defined by an inner end, an outer end and a tape portion between the inner and outer ends in which the tape portion together with the inner end is elastically wound within the housing to become released from the housing when required. The outer end of the tape strip is maintained outside the housing by a hook attached thereto.

A tubular protrusion extends from between the bottom surface and the front surface of the housing. The tubular protrusion is defined by a front end, a lower covering, side coverings and an upper covering so as to incorporate a predetermined tunnel. The tunnel is open into the housing so that the tape portion of the measuring tape strip makes an elastically reciprocal movement through the tunnel of the tubular protrusion. The upper covering of the tubular protrusion has an opening so that indicia of the tape strip are read from atop through the opening.

The opening communicates through the front end of the tubular protrusion, and the lower covering of the tubular protrusion is linearly straight-aligned with the bottom surface of the housing. The upper covering of the tubular protrusion may be downwardly waved toward the front end of the tubular protrusion. Selectively, the upper covering of the tubular protrusion is substantially parallel to the lower covering of the tubular protrusion.

The hook comprises a vertical plate, and rear portion extending rearward from a mid line of the vertical plate, wherein the rear portion is attachedly layered on the tape strip such that the outer end of the tape strip abuts on the mid line of the vertical plate. The rear portion of the hook is formed to fit in the opening of the upper covering of the tubular protrusion, or the rear portion of the hook becomes narrowed in width toward the housing. In a preferred version, a tape hold control is attached to the housing to hold or release the tape portion of the tape strip by selectively pushing the tape portion against an inner wall of the housing. A tape hold enhancer provided adjacent to the opening and within the housing to controllably soften the holding or releasing of the tape strip. The tape hold enhancer is formed of a rubber material. The tape hold enhancer has a plurality of ridges to become abuttingly layered thereon by the tape strip.

An advantage of the present invention is that the upper opening of the tubular protrusion enables a user to easily match target indicia of the tape strip with a measurement target object due to the widened range of viewable tape strip zone adjacent to the housing, thereby significantly improving measurement efficiency. Another advantage is that the tubular protrusion is conveniently utilized as a measurement guide that can be easily aligned on an edge line of a target object to facilitate making an initial rough measurement. A further advantage is that the tubular protrusion allows an additional safe grip by a user's thumb and index finger either when doing measurement or when being carried, thereby enhancing product reliability.

Although the present invention is briefly summarized, the full understanding of the invention can be obtained by the following drawings, detailed description and appended claims.

BRIEF DESCRIPTION OF THE DRAWINGS

These and other features, aspects and advantages of the present invention will become better understood with reference to the accompanying drawings, wherein.

DETAILED DESCRIPTION OF THE PREFERRED EMBODIMENTS

Figure 1:
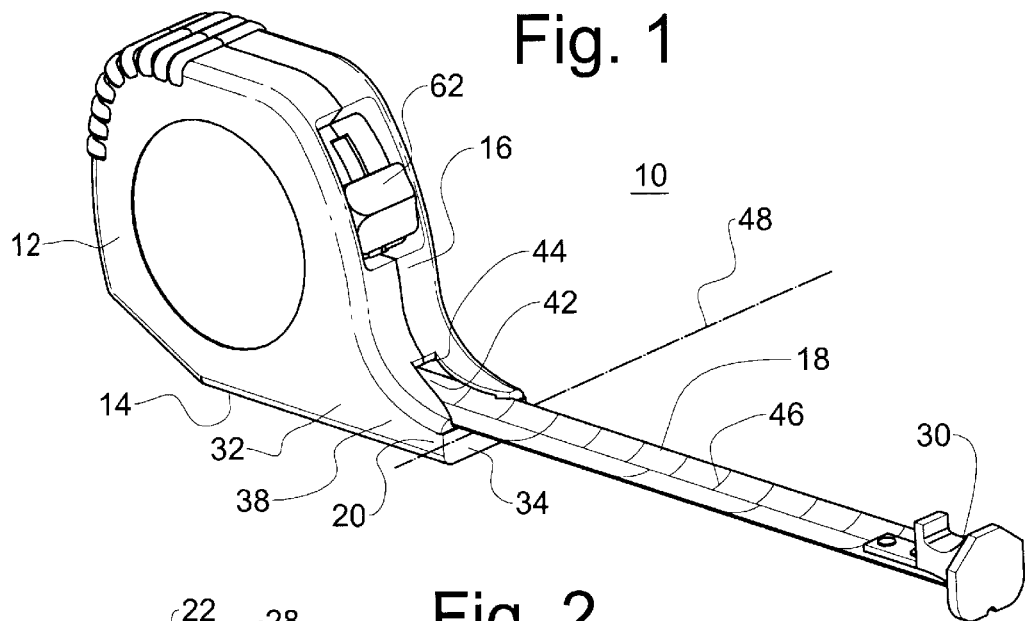
FIG. 1 is a perspective view showing a tape measure according to the present invention.

FIG. 1 shows a tape measure 10 according to the present invention. As shown therein, the tape measure 10 includes a housing 12 having a bottom surface 14 and a front surface 16. The front surface 16 is substantially perpendicular to the bottom surface 14. The tape measure 10 further includes a measuring tape strip 18 and a tubular protrusion 20.

Figure 2:
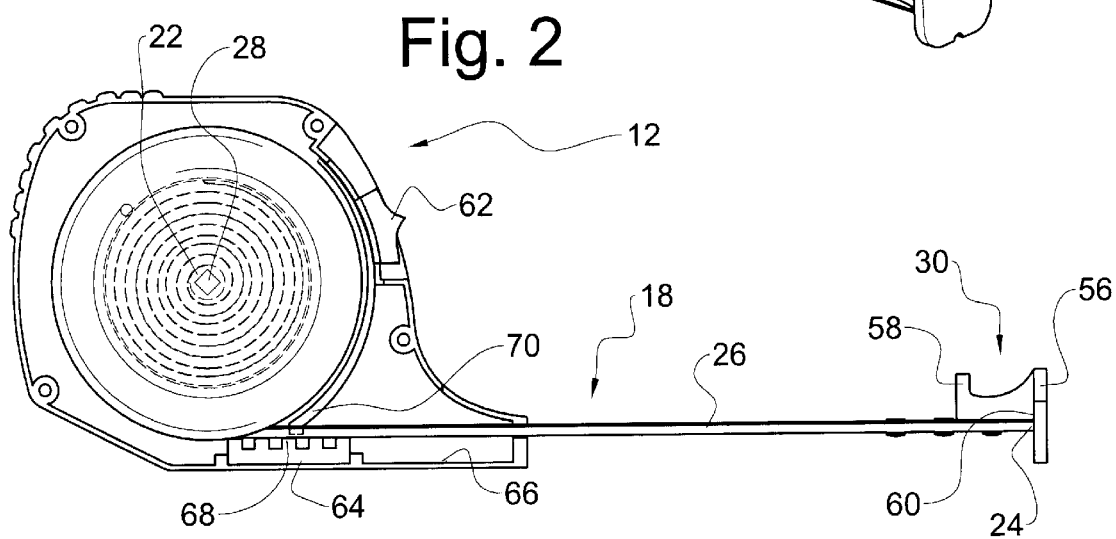
FIG. 2 is a cross-sectional front view of the tape measure according to the present invention where the tape strip stays released.
Figure 3:
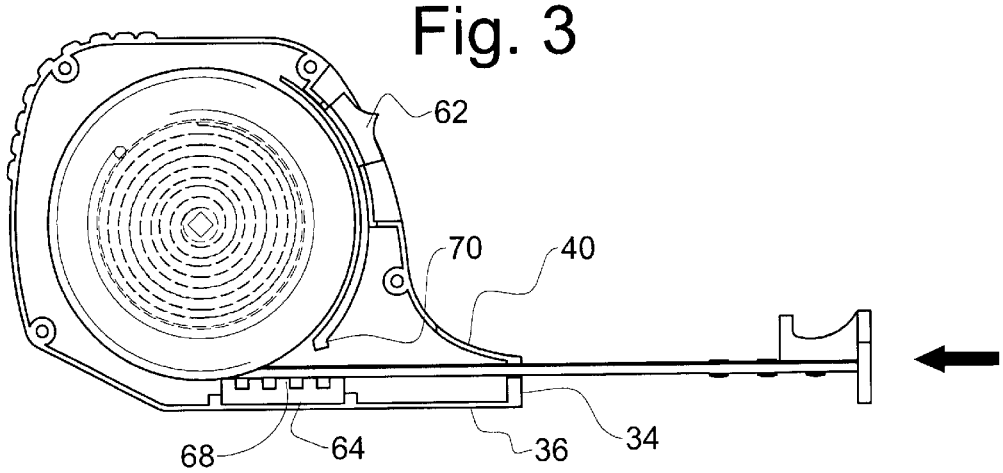
FIG. 3 is a cross-sectional front view of the tape measure according to the present invention where the tape strip is being wound.

As shown in FIGS. 2 and 3, the measuring tape strip 18 is defined by an inner end 22, an outer end 24 and a tape portion 26 between the inner and outer ends 22, 24. The tape portion 26 together with the inner end 22 is elastically coiled or wound within the housing 12 to become externally released from the housing 12 when required. That is, the inner end 22 is engaged to a spring member 28 and stays coiled together with the tape portion 26 inside the housing 12 until the outer end 24 is pulled out by a user (not shown).

In this construction, the outer end 24 of the tape strip 18 is maintained outside the housing 12 by a hook 30 attached thereto.

The tubular protrusion 20 is formed to extend from between the bottom surface 14 and the front surface 16 of the housing 12. That is, the tubular protrusion 20 extends from a lower front portion 32 of the housing 12. The tubular protrusion 20 is defined by a front end 34, a lower covering 36, side coverings 38 and an upper covering 40 so as to incorporate a predetermined tunnel 42. The tunnel 42 is open into the housing 12 so that the tape portion 26 of the measuring tape strip 18 makes an elastically reciprocal movement through the tunnel 42 of the tubular protrusion 20. Preferably, the tubular protrusion 20 is forwardly extended a quarter inch from the lower front portion 32 of the housing 12 or from between the bottom surface 14 and the front surface 16 of the housing 12.

The upper covering 40 of the tubular protrusion 20 has an opening 44 so that indicia 46 of the tape strip 18 are read from atop through the opening 44. That is, the opening 44 through the upper covering 40 of the tubular protrusion 20 is inwardly formed from the front end 34 of the protrusion 20 toward the lower front portion 32 of the housing 12 so that the indicia 46 can be clearly viewed and read from upside the housing 12 over a wider viewable range of the tape strip 18. Here, a target measurement line 48 on a target measurement object (not shown) such as a wood board can be set along either the front end 34 of the tubular protrusion 20 or the indicia indicator 50.

Figure 4:
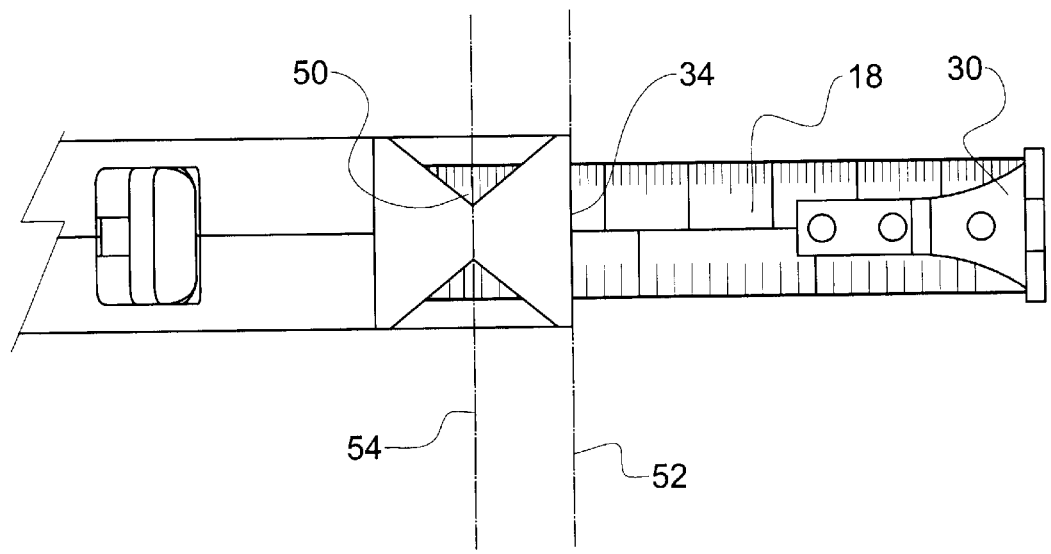
FIGS. 4 and 5 are plan views showing preferred embodiments of the present invention.
Figure 5:
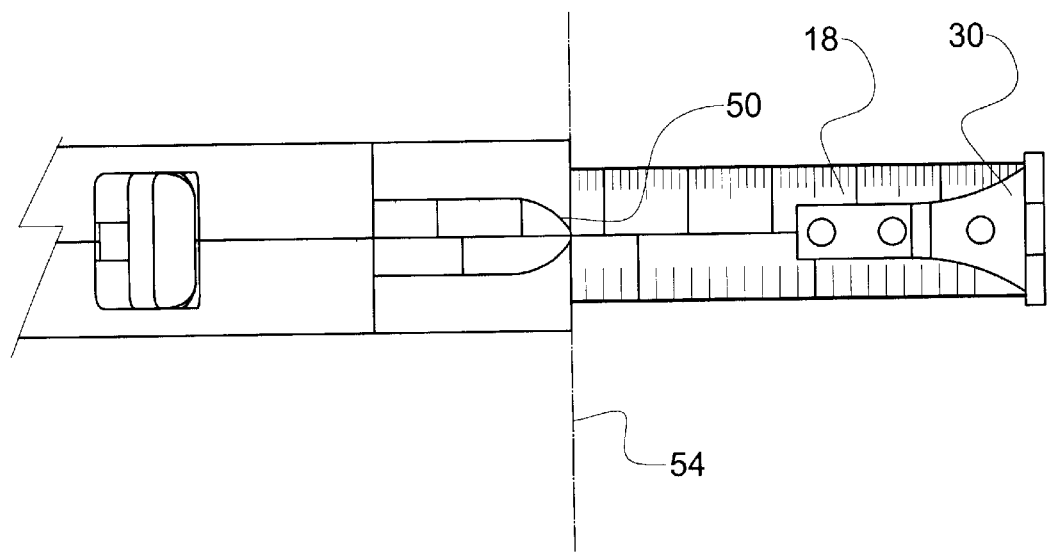

As further shown in FIGS. 4 and 5, the indicia indicator 50 can be either identical to or spaced from the front end 34 of the tubular protrusion 20 so as to secure a marginal distance setup. For example, when two linearly consecutive measurements are required for the same wood board, a first measurement line 52 can be set along the front end 34 of the tubular protrusion 20 and a second measurement 54 can be set along the indicia indicator 50 as shown in FIG. 4.

The opening 44 through the upper covering 40 of the tubular protrusion 20 is formed to communicate through the front end 34 of the tubular protrusion 20. Preferably, the lower covering 36 of the tubular protrusion 20 is linearly straight-aligned with the bottom surface 14 of the housing 12. The upper covering 40 of the tubular protrusion 20 is downwardly waved toward the front end 34 of the tubular protrusion 20 to provide a stably grip to the user. For example, the user's thumb (not shown) can be placed on the downwardly waved upper covering 40 of the tubular protrusion 20 while performing measurements, thereby enabling a stabilized measurement operation.

Alternately, the upper covering 40 of the tubular protrusion 20 may be substantially parallel to the lower covering 36 of the tubular protrusion 20.

Meanwhile, the hook 30 comprises a vertical plate 56 and a rear portion 58 extending rearward from a mid line 60 of the vertical plate 56. The rear portion 58 is attachedly layered on the tape strip 18 such that the outer end 24 of the tape strip 18 abuts on the mid line 60 of the vertical plate 56. It is preferred that the rear portion 58 of the hook 30 is formed to fit in the opening 44 through the upper covering 40 of the tubular protrusion 20. That is, when the tape strip 18 is elastically rewound into the housing 12, the rear portion 58 of the hook 30 is received in the opening 44 of the tubular protrusion 20 when measurement is completed. For a better performance, the rear portion 58 of the hook 30 becomes narrowed in width toward the housing 12.

As shown back in FIGS. 3 and 4 each demonstrating a switching mechanism to release or rewind the tape strip 18, the tape measure 10 further comprises a tape hold control 62 and a tape hold enhancer 64. The tape hold control 62 serving as a control switch is attached to the housing 12 to hold or release the tape portion 26 of the tape strip 18 by selectively pushing the tape portion 26 against an inner wall 66 of the housing 12.

The tape hold enhancer 64 is provided adjacent to the tubular protrusion 20 and within the housing 12 to controllably soften the holding or releasing of the tape strip 18. The tape hold enhancer 64 is preferably formed of a rubber material and glued to the inner wall 66 of the housing 12. The upper surface of the tape hold enhancer 64 or rubber material has a plurality of ridges 68 to become abuttingly layered by the tape strip 18. The tape hold control 62 includes a push end 70 to push the tape strip 18 against the ridges 68 of the tape hold enhancer 64 in accordance with operation of the tape hold control 62. For example, the tape hold control 62 is pushed down by the user to hold the tape strip 18 and pulled up to release the tape strip 18 for measurement operation.

As discussed above, the tape measure 10 according to the present invention is advantageous in that the upper opening 44 of the tubular protrusion 20 enables a user to easily match target indicia 46 of the tape strip 18 with a measurement target object (not shown) by the widened range of viewable tape strip zone adjacent to the housing 12, thereby significantly improving measurement efficiency.

Another advantage of the present invention is that the tubular protrusion 20 is conveniently utilized as a measurement guide that can be easily aligned on an edge line of a target object to facilitate making an initial rough measurement. A further advantage is that the tubular protrusion allows an additional safe grip by a user's thumb and index finger either when doing measurement or when being carried, thereby enhancing product reliability.

Although the invention has been described in considerable detail with reference to certain preferred versions thereof, other versions are possible by converting the aforementioned construction. Therefore, the scope of the invention shall not be limited by the specification specified above and the appended claims.

What is claimed is:

1. A tape measure, comprising:

a) a housing having a bottom surface and a front surface substantially perpendicular to the bottom surface;

b) a measuring tape strip defined by an inner end, an outer end and a tape portion between the inner and outer ends, wherein the tape portion together with the inner end is elastically wound within the housing to become released from the housing when required, wherein the outer end of the tape strip is maintained outside the housing by a hook attached thereto; and c) a tubular protrusion extending from between the bottom surface and the front surface of the housing, wherein the tubular protrusion is defined by a front end, a lower covering, side coverings and an upper covering so as to incorporate a predetermined tunnel, wherein the tunnel is open into the housing so that the tape portion of the measuring tape strip makes an elastically reciprocal movement through the tunnel of the tubular protrusion, wherein the upper covering of the tubular protrusion has an opening so that indicia of the tape strip are read from atop through the opening.

2. The tape measure of claim 1 wherein the opening communicates through the front end of the tubular protrusion.

3. The tape measure of claim 1 wherein the lower covering of the tubular protrusion is linearly straight with the bottom surface of the housing.

4. The tape measure of claim 1 wherein the upper covering of the tubular protrusion is downwardly waved toward the front end of the tubular protrusion.

5. The tape measure of claim 1 wherein the upper covering of the tubular protrusion is substantially parallel to the lower covering of the tubular protrusion.

6. The tape measure of claim 1 wherein the tubular protrusion is forwardly extended a quarter inch from a lower front portion of the housing or from between the bottom surface and the front surface of the housing.

7. The tape measure of claim 1 wherein the hook comprises:

a) a vertical plate;

b) a rear portion extending rearward from a mid line of the vertical plate, wherein the rear portion is attachedly layered on the tape strip such that the outer end of the tape strip abuts on the mid line of the vertical plate.

8. The tape measure of claim 7 wherein the rear portion of the hook is formed to fit in the opening of the upper covering of the tubular protrusion.

9. The tape measure of claim 7 wherein the rear portion of the hook becomes narrowed in width toward the housing.

10. The tape measure of claim 9 wherein the rear portion of the hook is formed to fit in the opening of the upper covering of the tubular protrusion.

11. The tape measure of claim 1 further comprising:

a) a tape hold control attached to the housing to hold or release the tape portion of the tape strip by selectively pushing the tape portion against an inner wall of the housing; and b) a tape hold enhancer provided adjacent to the opening and within the housing to controllably soften the holding or releasing of the tape strip.

12. The tape measure of claim 11 wherein the tape hold enhancer is formed of a rubber material.

13. The tape measure of claim 11 wherein an upper surface of the tape hold enhancer has a plurality of ridges to become abuttingly layered thereon by the tape strip.

14. The tape measure of claim 13 wherein the tape hold enhancer is formed of a rubber material.

* * * * *